June 12, 1956   J. W. ADELT   2,749,757
SEALING BOOT
Filed July 14, 1954
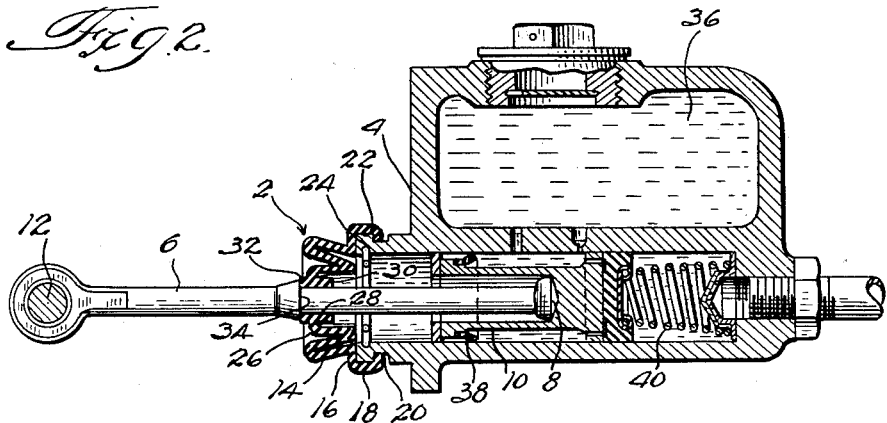
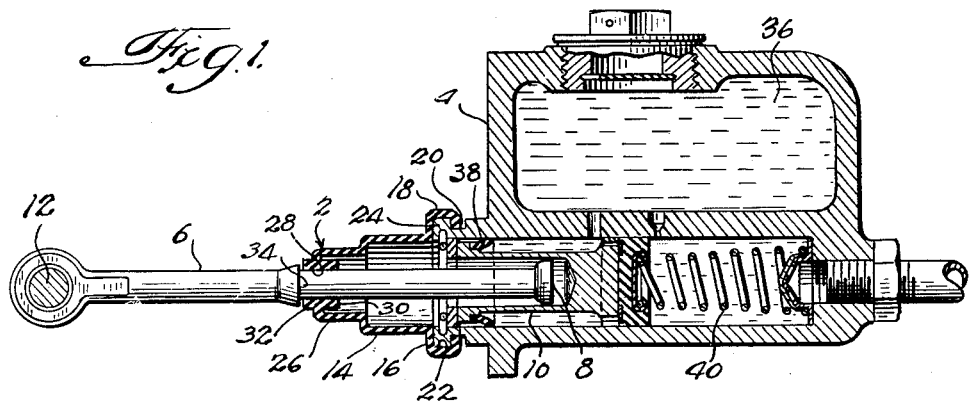
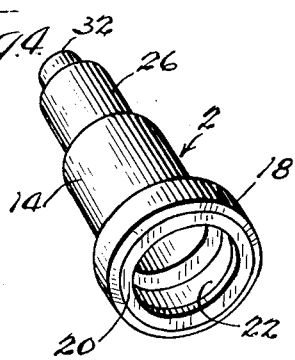
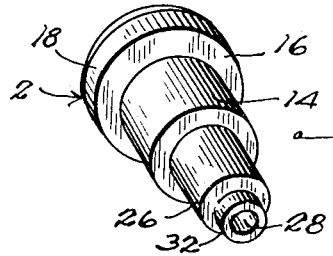
INVENTOR.
Joseph W. Adelt.
BY B. Gordon Allen.

United States Patent Office 2,749,757
Patented June 12, 1956

2,749,757

SEALING BOOT

Joseph W. Adelt, Chicago, Ill., assignor to United Parts Mfg. Co., Chicago, Ill., a corporation of Illinois Application July 14, 1954, Serial No. 443,266

3 Claims. (Cl. 74—18.2)

This invention relates to seals, and more particularly to a novel boot for sealing an opening within which a plunger is received, as for example, the piston actuating plunger of an hydraulic master brake cylinder such as is commonly used in automotive vehicles.

According to prior art practices, such boots have generally been either of tapered or bellows construction. The bellows type boots are expensive to manufacture and afford very little spring action to bias the piston actuating plunger to its brake release position. The tapered or conical boots are cheaper in construction than the bellows type but have a much shorter service life due to crushing of the boot as the plunger moves into the master cylinder to brake applied position. Also, the tapered boots afford an efficient spring action for the purpose above described.

Accordingly, a primary object of the present invention is to devise a boot which is economical to manufacture and is capable of long life in service, thus combining the advantages of both prior art types of boot.

Another object of the invention is to provide efficient spring action for biasing the plunger to movement outwardly of the master cylinder.

A more specific object of the invention is to devise a boot having a stepped construction capable of telescopic action as the plunger moves into the cylinder.

A further object of the invention is to provide a boot such as above described with an outturned peripheral flange at its large end, the flange terminating in a re-entrant flange to define a recess for reception of a mating flange on the cylinder.

Still another object of the invention is to flange the smaller-diameter portion of the boot around its opening within which the plunger is tightly fitted. In the novel construction, the opening is flanged around the interior and exterior sides thereof to afford an improved seal around the plunger during reciprocal movements thereof and during universal movement thereof relative to the brake applying piston in the master cylinder.

The foregoing and other objects and advantages of the invention will become apparent from a consideration of the following specification and accompanying drawings, wherein:

Figure 1 is an axial sectional view of a boot embodying a preferred form of the invention, the boot being shown in its expanded or free position with an associated plunger at its outermost position relative to the master cylinder;

Figure 2 is a sectional view similar to Figure 1 but showing the boot in telescoped or compressed position;

Figure 3 is a perspective view of the boot from the small end thereof; and

Figure 4 is a perspective view of the boot from the large end thereof.

Describing the invention in detail, it will be seen that the novel boot 2 is attached to a casing 4 of a conventional master cylinder for an automotive brake system, although it will be understood that the boot may be utilized to afford a universally flexible sealed connection between any casing and a plunger or rod movable therein.

In the illustrated embodiment of the invention, the boot is preferably resilient and is connected to a plunger or rod 6 having a universal connection at 8 to a brake applying piston 10, the plunger being adapted for connection at 12 to any desired linkage associated with the brake pedal of an automotive vehicle.

The novel boot comprises a larger-diameter substantially cylindrical portion 14 which is provided with a flange 16 extending radially outwardly therefrom. The flange 16 joins a substantially cylindrical segment 18 which has a reentrant flange 20 defining with the flange 16 an annular recess or groove 22 to receive and clamp a flange 24 of the casing 4.

The larger-diameter portion of the boot is integrally joined at one end thereof with a smaller-diameter substantially cylindrical portion 26, the end of which, remote from the portion 14, is closed except for a central opening 28 receiving the rod 6 and the opening is preferably flanged as at 30 on the inside of said opening and at 32 on the outside of said opening.

This novel construction defines a sleeve 32, 34 within which the rod 6 is tightly fitted to afford an improved seal therearound during universal movements thereof relative to piston 10. The sleeve 32, 34 also prevents tearing of the boot around opening 28.

The rod 6 is preferably provided with a shoulder 34 engageable with flange 32 as the rod enters the casing 4, as illustrated in Figure 2. Thus the boot 2 not only functions as a spring to yieldingly resist movement of the rod into the casing and to bias the rod to the position of Figure 1, but also functions as a seal to prevent entrance of dust or other foreign material into the casing and to prevent leakage of hydraulic brake fluid 36 which may occasionally be lost from the brake system by passing a seal 38 of the piston 10.

It will also be understood that the boot in either its free position of Figure 1 or its telescoped position of Figure 2 accommodates universal movement of the rod 6 with respect to the piston 10, as is desirable under service conditions.

Referring now to Figure 2, it will be seen that the boot 2 in its telescoped position is so formed that the smaller-diameter portion 26 is received or telescoped within the larger diameter position 14 to accommodate movement of the rod 6 inwardly of the casing without crushing or otherwise distorting the boot. This novel stepped construction not only insures that the boot will have a long life in service but also affords a more effective spring action than prior art boots for the purpose of biasing the rod 6 to its normal or release position of Figure 1.

The boot is preferably formed of a resilient material such as rubber, in order to afford the above-described spring action for biasing the plunger 6 to movement outwardly of the casing. However, if desired, the boot may be formed of any flexible material such as a fabric or plastic.

According to prior art practices, boots of the so-called conical or tapered type have resulted in crushing or distorting thereof with consequent short service life and very little spring action. Bellows type boots have afforded practically no spring action and have been very expensive to manufacture.

Thus it will be understood that the novel boot is simple and more economical to manufacture than prior art bellows type boots and has a much better service life than the conical prior art boot. Furthermore, the novel boot affords a more effective spring action than any of the prior art boots for the purpose of biasing the rod to release position and thereby aiding the spring 40 usually provided in the casing for that purpose.

While the present invention has been explained and described with reference to specific embodiments of structure, it will be understood, nevertheless, that numerous modifications and variations are susceptible of being incorporated without departure from the essential spirt or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. In a boot for sealing a casing opening within which a plunger is movable, the combination of a resilient stepped member, said member having a large end with means for attachment to the casing around the opening, and said member having a small end with an opening within which the plunger is tightly fitted, said small end having abutment with a shoulder on the plunger facing said opening whereby as the plunger moves into the opening, the member is telescoped and resiliently biases the plunger to move outwardly of said opening.

2. In a boot for sealing an opening of a casing within which opening a plunger reciprocates in universal connection with a piston in the casing; the combination of a hollow flexible member having a larger-diameter portion with an open end secured to the casing around the opening, said member having a smaller-diameter portion integrally connected at one end thereof to the other end of said larger-diameter portion, the opposite end of said smaller-diameter portion having an opening within which the plunger is tightly fitted, said last-mentioned end engaging an abutment of the plunger facing said opening, whereby as the plunger moves into the opening the smaller-diameter portion is telescoped within the larger diameter portion.

3. A boot of the class described, comprising a plurality of hollow resilient cylindrical sleeves of decreasing diameter, integrally connected to each other to form a single unitary resilient stepped member, said member having a central opening at its smallest end to receive an associated plunger; means for gripping said plunger, said means comprising flanges, extending axially of said opening; a second opening at the larger end of said member, said second opening being provided with a peripheral outturned flange, terminating in a reentrant flange, said flanges defining a recess to receive an associated casing flange.

References Cited in the file of this patent

UNITED STATES PATENTS

| | | |
|---|---|---|
| 821,926 | Cornish | May 29, 1906 |
| 1,585,175 | Steele | May 18, 1926 |
| 2,089,491 | Kuiper | Aug. 10, 1937 |

FOREIGN PATENTS

| | | |
|---|---|---|
| 498,043 | Germany | May 17, 1930 |
| 706,519 | Germany | May 28, 1941 |